(12) United States Patent
Watanabe et al.

(10) Patent No.: US 8,325,243 B2
(45) Date of Patent: *Dec. 4, 2012

(54) IMAGE STABILIZATION CONTROL CIRCUIT FOR CORRECTING VIBRATION-CAUSED DISPLACEMENT OF OPTICAL AXIS, AND IMAGE PICKUP APPARATUS PROVIDED WITH THE SAME

(75) Inventors: Tomofumi Watanabe, Gifu (JP); Yasunori Nagata, Gifu (JP)

(73) Assignees: Semiconductor Components Industries, LLC, Phoenix, AZ (US); Sanyo Semiconductor Co., Ltd., Gumma (JP)

( * ) Notice: Subject to any disclaimer, the term of this patent is extended or adjusted under 35 U.S.C. 154(b) by 804 days.

This patent is subject to a terminal disclaimer.

(21) Appl. No.: 12/332,743

(22) Filed: Dec. 11, 2008

(65) Prior Publication Data

US 2009/0160959 A1 Jun. 25, 2009

(30) Foreign Application Priority Data

Dec. 19, 2007 (JP) ................................. 2007-327846

(51) Int. Cl.
*H04N 5/228* (2006.01)

(52) U.S. Cl. .................................................. 348/208.4

(58) Field of Classification Search ............... 348/208.2, 348/208.7, 208.11, 208.99, 208.1, 208.4; 396/55, 53; 382/107

See application file for complete search history.

(56) References Cited

U.S. PATENT DOCUMENTS

| | | | | | |
|---|---|---|---|---|---|
| 6,078,751 | A | * | 6/2000 | Yamazaki et al. | 396/55 |
| 8,026,949 | B2 | * | 9/2011 | Watanabe | 348/208.4 |
| 2005/0031326 | A1 | * | 2/2005 | Yamazaki | 396/55 |

FOREIGN PATENT DOCUMENTS

| | | | |
|---|---|---|---|
| EP | 1713259 A2 | * | 10/2006 |
| EP | 1742463 A1 | * | 1/2007 |
| JP | 07-261228 | | 10/1995 |
| JP | 10-213832 | | 8/1998 |
| JP | 11-167134 | | 6/1999 |
| JP | 2003057706 A | * | 2/2003 |
| JP | 2006-047748 A | | 2/2006 |

OTHER PUBLICATIONS

Japanese Notification of Reason(s) for Refusal, w/ English translation thereof, issued in Japanese Patent Application No. JP 2007-327846 dated Feb. 14, 2012.

Japanese Office Action, and English translation thereof, issued in Japanese Patent Application No. 2007-327846 dated Sep. 11, 2012.

* cited by examiner

Primary Examiner — Aung S Moe
(74) Attorney, Agent, or Firm — McDermott Will & Emery LLP

(57) ABSTRACT

A first equalizer generates a vibration-component signal indicating the amount of movement of an image pickup apparatus according to an output signal of a vibration detecting element for detecting the vibration of the image pickup apparatus. The second equalizer generates a drive signal used to control a driver element to correct the position of a lens or image pickup devices, based on the output signal of a position detecting element for detecting the position of the lens to be driven or the image pickup devices to be driven and the vibration-component signal. A control unit verifies the operations of the driver element, the position detecting element, the vibration detecting element and the first equalizer, based on the output signal of the position detecting element and the vibration-component signal.

4 Claims, 5 Drawing Sheets

IMAGE STABILIZATION CONTROL CIRCUIT FOR CORRECTING VIBRATION-CAUSED DISPLACEMENT OF OPTICAL AXIS, AND IMAGE PICKUP APPARATUS PROVIDED WITH THE SAME

CROSS-REFERENCE TO RELATED APPLICATIONS

This application is based upon and claims the benefit of priority from the prior Japanese Patent Application No. 2007-327846, filed on Dec. 19, 2007, the entire contents of which are incorporated herein by reference.

BACKGROUND OF THE INVENTION

1. Field of the Invention

The present invention relates to an image stabilization control circuit for correcting a vibration-caused displacement of the optical axis, and an image pickup apparatus that includes said image stabilization control circuit.

2. Description of the Related Art

Digital still cameras and digital movie cameras (hereinafter generically referred to as digital cameras) have been widely used by general users. Various methods for correcting camera shake are proposed for users who are not familiar with how to handle the cameras properly and therefore are likely to encounter camera shake when taking pictures. Among those digital cameras available, there is one, mounted on a portable telephone, which serves as one of functions in the portable telephone and a certain type of them are so designed that the camera is held by one hand only. In such devices operated by a thumb in one hand, the camera shake is more likely to occur as compared with commonly used cameras held by two hands to take pictures.

The following method is in practical use today to correct such camera shake. That is, the optical axis is corrected by a vibration detecting element for detecting the vibration of a camera and a driver element that moves a lens position in such a direction as to cancel out the displacement caused by the vibration.

SUMMARY OF THE INVENTION

The inventor of the present invention has developed an image stabilization control circuit that organically controls the aforementioned vibration detecting element and driver element.

A correction apparatus according to one embodiment of the present invention is an image stabilization control circuit for correcting an optical axis of an image pickup apparatus in response to a vibration thereof, and the circuit comprises: a first equalizer which generates a vibration-component signal indicating a amount of movement of the image pickup apparatus according to an output signal of a vibration detecting element for detecting the vibration of the image pickup apparatus; a second equalizer which generates a drive signal used to control a driver element to correct the position of lens and image pickup devices, based on an output signal of a position detecting element for detecting the position of the lens to be driven or the image pickup devices to be driven and the vibration-component signal; and a control unit which verifies operations of the driver element, the position detecting element, the vibration detecting element and the first equalizer, based on the output signal of the position detecting element and the vibration-component signal.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

Figure 1:
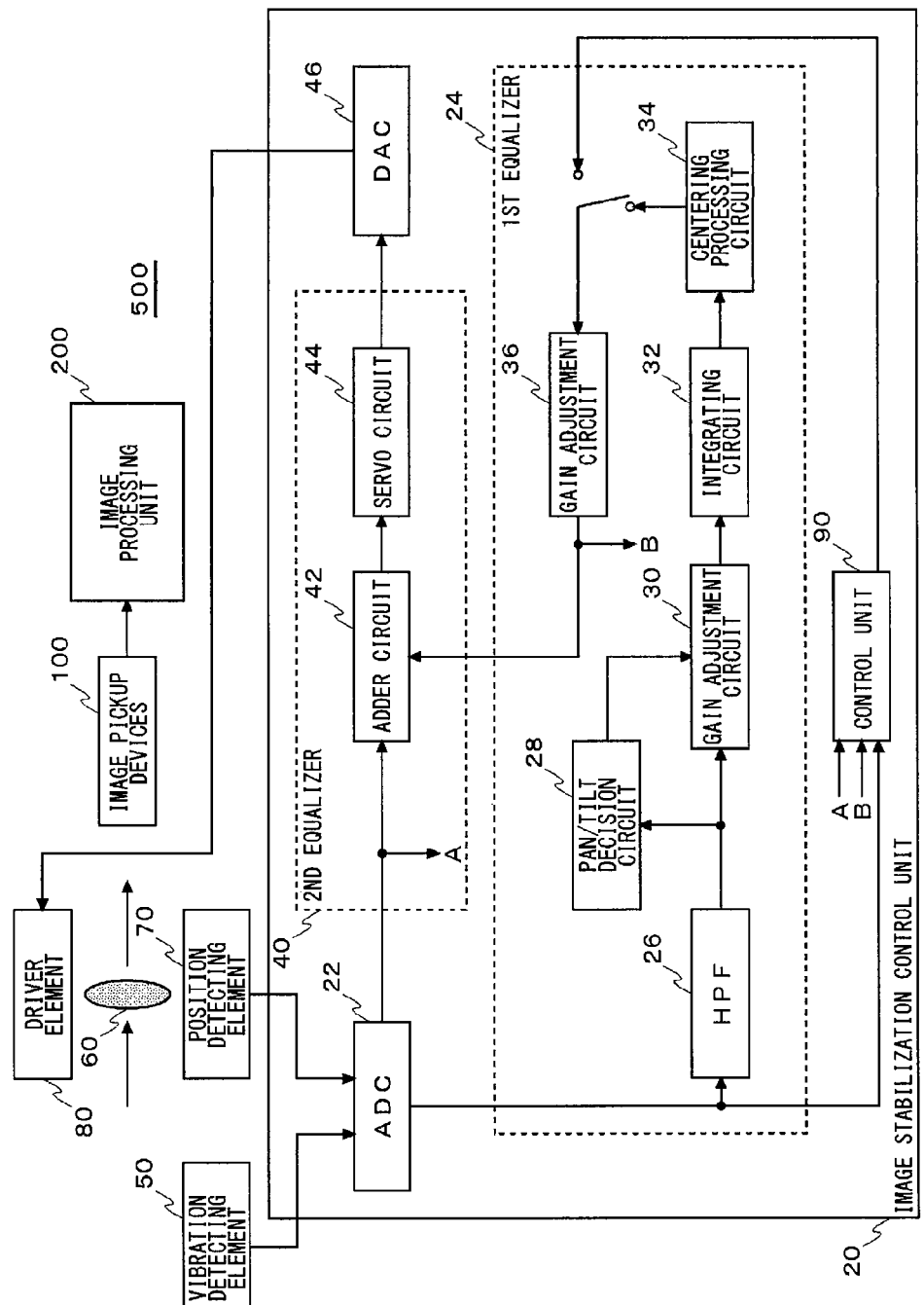
FIG. 1 is a block diagram showing a structure of an image pickup apparatus that includes an image stabilization control circuit according to a first embodiment of the present invention.

FIG. 1 is a block diagram showing a structure of an image pickup apparatus 500 that includes an image stabilization control circuit 20 according to a first embodiment of the present invention.

The image pickup apparatus 500 includes a lens 60, a driver element 80, a position detecting element 70, a vibration detecting element 50, an image stabilization circuit 20, image pickup devices 100, and an image processing unit 200.

The image stabilization control circuit 20 includes a first equalizer 24, a second equalizer 40, an ADC (analog-to-digital converter) 22, a DAC (digital-to-analog converter) 46, and a control unit 90.

The first equalizer 24 includes an HPF (high-pass filter) 26, a pan/tilt decision circuit 28, a gain adjustment circuit 30, an integrating circuit 32, a centering processing circuit 34, and a gain adjustment circuit 36. The second equalizer 40 includes an adder circuit 42 and a servo circuit 44.

The image pickup devices 100 convert the light signals transmitted through the lens 60 which is an optical component, into electric signals. The image pickup devices 100 may be CCD (charge-coupled device) sensors and CMOS (complementary metal-oxide semiconductor) image sensors. The image processing unit 200 performs various processings on image signals picked up by the image pickup devices 100 and compresses and codes them.

The driver element 80, such as a voice coil motor, drives the lens 60. The position detecting element 70, such as a hall element, detects the position of the lens 60. The vibration detecting element 50, such as a gyro sensor, detects the vibration applied to the image pickup apparatus 50.

The first equalizer 24 obtains an amount of movement of the image pickup apparatus 500 in response to an output signal of the vibration detecting element 50, and produces a vibration-component signal with which to correct this amount of movement. The amount of movement of the image pickup apparatus 500 can be obtained by integrating the output signal of the vibration detecting element 50.

To correct the position of the lens 60, the second equalizer 40 generates a signal with which to control the driver element 80, based on the output signal of the signal detecting element 70 and the signal generated by the first equalizer 24. Based on this signal, the driver element 80 controls the position of the lens 60 so that the optical axis of the lens 60 agrees with the center of the image pickup devices 100.

The control unit 90 verifies the operations of the driver element 80, the position detecting element 70, the vibration detecting element 50 and the first equalizer 24, based on the output signal of the position detecting element 70 to be inputted to the first equalizer 40 and the vibration-component signal to be outputted from the first equalizer 24. The control unit 90 may be a CPU or a logic circuit that executes a predetermined decision or predetermined calculation and decision.

In the first embodiment, the operation is examined in a situation where at least the driver element 80, the position detecting element 70, the vibration detecting element 50 and the image stabilization control circuit 20 are vibrated by a shaker. It goes without saying that the whole of the image pickup apparatus 500 may be subjected to vibration. Note that an example where no shaker is used will be described in a second embodiment discussed later.

In the vibrated state as described above, the control unit 90 verifies whether the phase difference in between the output signal of the position detecting element 70 and the output signal of the first equalizer 24 is zero or not. If the phase difference in between the output of the position detecting element 70 and the output of the first equalizer 24 lies within a range of values, set by a designer, which can be regarded as zero, the control unit 90 will determine the phase difference to be zero. If the phase difference is zero, the condition will be determined satisfactory. If not, it will be determined faulty.

Also, the control unit 90 verifies if, in the vibrated state as described above, the amplitudes of the output signal of the position detecting element 70 and the output signal of the first equalizer 24 are opposite in polarity and equal to each other or not. If the amplitudes of the output signal of the position detecting element 70 and the output signal of the first equalizer 24 lie within a range of values, set by the designer, which can be regarded as being equal to each other, the control unit 90 will determine the amplitudes thereof to be equal. If the amplitudes thereof are opposite in polarity and equal to each other, the condition will be determined satisfactory. If not, the condition will be determined faulty. It goes without saying that the above-described phase difference determination and this amplitude determination can be both executed.

When determined to be faulty, it can be detected that at least one of the driver element 80, the position detecting element 70, the vibration detecting element 50 and the image stabilization control circuit 20 is somehow faulty. Note that which particular structural component has a defect cannot be specified by the above-described determinations only.

The output signal of the first equalizer 24 is used to cancel out the amount of movement of the image pickup apparatus 500 calculated based on an acceleration component detected by the vibration detecting element 50. Accordingly, if the driver element 80 moves the lens 60, in such a direction as to cancel out said amount of movement, based on this signal, the output signal of the position detecting element 70 must satisfy the above-described two decision conditions.

To specifically execute the above-described determinations, the control unit 90 adds up the output signal (signal A in FIG. 1) of the position detecting element 70 and the output signal (signal B in FIG. 1) of the equalizer 24. In other words, the control unit 90 subtracts the absolute value of one signal from the absolute signal of the other signal and determines if the result is zero or not.

If a CPU is used for the control unit 90, the processing performed by the first equalizer 24 can be done by this control unit 90 alternatively. That is, the processing for compensating for the amount of movement based on the output signal of the vibration detecting element 50 may be carried out hardwarewise by the first equalizer 24 or may be carried out softwarewise by the control unit 90. This CPU can take charge of both the above-described verification processing and the compensation processing.

A concrete description is given hereunder of a structure and an operation of the image stabilization control circuit 20.

A gyro sensor 50a may be used as the vibration detecting element 50. The image stabilization control circuit 20 is hereinbelow described using an example where the gyro sensor 50a is used. Assume herein that the gyro sensor 50a detects the acceleration due to a camera shake caused by a user holding the image pickup apparatus 500 as an angular velocity. A hall element 70a may be used as the position detecting element 70. The image stabilization control circuit 20 is hereinbelow described using an example where the hall element 70a is used. A voice coil motor (VCM) 80a may be used as the driver element 80. The image stabilization control circuit 20 is hereinbelow described using an example where the VCM 80a is used.

The gyro sensor 50a detects the angular velocities in two-axis (X-Y) directions of the image pickup apparatus 500. After an analog angular velocity signal obtained by the gyro sensor is amplified by a not-shown amplifier circuit, the amplified signal is outputted to the ADC (analog-to-digital converter) 22. The ADC 22 converts the angular velocity signal amplified by the amplifier circuit into a digital angular velocity signal. The angular velocity signal outputted from the ADC 22 is outputted to the first equalizer 24.

In the first equalizer 24, the digital angular velocity signals outputted from the ADC 22 are first inputted to the HPF (high-pass filter) 26. Out of the angular velocity signals outputted from the gyro sensor 50a, the HPF 26 removes frequency components thereof lower than the frequency components due to the camera shake. In general, the frequency components due to the camera shake lie in the range of 1 to 20 Hz, so that those less than or equal to 0.7 Hz, for instance, are removed from the angular velocity signals.

The pan/tilt decision circuit 28 detects a pan operation and a tilt operation of the image pickup apparatus 500, based on the angular velocity signal outputted from the HPF 26. When it is detected that the angular velocity signal continues to be greater than or equal to a predetermined threshold value for a certain period of time, the pan/tilt decision circuit 28 determines that the image pickup apparatus 500 is panning or tilting. Note that moving the image pickup apparatus 500 in the horizontal direction in response to the movement of an object or the like is called the pan operation whereas moving it in the vertical direction in response thereto is called the tilt operation.

The gain adjustment circuit 30 varies the gain of the angular velocity signal outputted from the HPF 26, according to the decision result of the pan/tilt decision circuit 28. For example, if the image pickup apparatus 500 is not panning or tilting, the gain adjustment circuit 30 will make such an adjustment as to maintain the strength of the angular velocity signal outputted from the HPF 26. If the image pickup apparatus 500 is panning or tilting, the gain adjustment circuit 30 will make adjustments so that the output of the HPF 26 becomes 0 by reducing the strength of the angular velocity signal outputted from the HPF 26.

The integrating circuit 32 integrates the angular velocity signals outputted from the gain adjustment circuit 30 so as to generate a vibration-component signal indicating the amount of movement of the image pickup apparatus 500. For example, the integrating circuit 32, which is preferably configured by including a not-shown digital filter, performs filtering processing according to a filter coefficient set by a not-shown register and thereby obtains the vibration-component signal, namely the amount of movement of the image pickup apparatus 500.

When the camera-shake correction processing is to be carried out in the image pickup apparatus 500, there are cases where as the correction processing continues to be carried out, the position of the lens 60 is gradually displaced away from a reference position and the position of the lens 60 eventually reaches a neighborhood of the limiting point of the lens movable range. In such a case, if the camera shake correction processing continues, the lens can still further move in one direction but cannot move in the other direction. The centering processing circuit 34 is so provided as to prevent this.

The vibration-component signal outputted from the centering processing circuit 34 is adjusted by the gain adjustment circuit 36 to the range of the output signals of the hall element 70a. The vibration-component signal adjusted by the gain adjustment circuit 36 is outputted to the second equalizer 40.

The hall element 70a, which is a magnetic sensor using the Hall effect, functions as a position detecting element that detects the position in the X and Y directions of the lens 60. An analog positional signal containing the positional information on the lens 60 obtained by the hall element 70a is amplified by the not-shown amplifier circuit and is then outputted to the ADC 22. The ADC 22 converts the analog positional signal amplified by this amplifier circuit into a digital positional signal. Note that the ADC 22 converts the aforementioned analog angular velocity signal and analog positional signal into their digital signals in a time sharing manner.

The positional signal outputted from the ADC 22 is outputted to the second equalizer 40. In the second equalizer 40, the positional signal outputted from the ADC 22 is first inputted to the adder circuit 42. The vibration-component signal adjusted by the gain adjustment circuit 36 is inputted to the adder circuit 42. The adder circuit 42 adds up the inputted positional signal and the vibration-component signal. A signal outputted from the adder circuit 42 is outputted to the servo circuit 44. In response to the output signal from the adder circuit 42, the servo circuit 44 generates a signal used to control the drive of the VCM 80a. Note that a filtering processing using a servo-control digital filter may be executed in the servo circuit 44.

A VCM drive signal outputted from the servo circuit 44 is converted into an analog signal from a digital signal by the DAC (digital-to-analog converter) 46. The analog VCM drive signal is amplified by the not-shown amplifier circuit and then the thus amplified analog VCM drive signal is outputted to the VCM 80a. The VCM 80a moves the position of the lens 60 in the X and Y directions, based on the VCM drive signal.

A description is now given of operations of the image pickup apparatus 500 according to the present embodiment when there is no camera shake and when there is a camera shake, respectively.

(Operation when there is No Camera Shake)

Where no camera shake occurs, no angular velocity is produced in the image pickup apparatus 500, so that the signal outputted from the first equalizer 24 is "0". The lens 60 to be driven by the VCM 80a lies in such a position that the optical axis thereof agrees with the center of the image pickup devices 100 provided in the image pickup apparatus 500. Hence, the analog positional signal from the hall element 70a is converted by the ADC 22 into a digital positional signal indicating "0" and then this digital positional signal is outputted to the second equalizer 40. As a result, the servo circuit 44 outputs a signal for controlling the VCM 80a in such a manner as to maintain the position of the current position of the lens 60.

If the optical axis of the lens 60 does not agree with the center of the image pickup devices 100, the analog positional signal from the hall element 70a will be converted by the ADC 22 into a digital positional signal indicating a value different from "0" and then this digital positional signal will be outputted to the second equalizer 40. In response to the digital positional signal outputted from the ADC 22, the servo circuit 44 controls the VCM 80a so that the value of the positional signal becomes "0".

By repeating such an operation as described above, the position of the lens 60 is controlled so that the optical axis of the lens 60 agrees with the center of the image pickup devices 100.

(Operation when there is a Camera Shake)

The lens 60 driven by the VCM 80a lies in such a position that the optical axis thereof agrees with the center of the image pickup devices 100 provided in the image pickup apparatus 500. Hence, the analog positional signal from the hall element 70a is converted by the ADC 22 into a digital positional signal indicating "0" and then this digital positional signal is outputted to the second equalizer 40.

At the same time, since the image pickup apparatus 500 is moved as a result of the camera shake, the integrating circuit 32 and the centering processing circuit 34 output a vibration-component signal indicating an amount of movement of the image pickup apparatus 500, based on the angular velocity signal detected by the gyro sensor 50a.

The servo circuit 44 generates a drive signal of the VCM 80a according to the signal obtained by adding the positional signal indicating "0" outputted from the ADC 22 and the vibration-component signal outputted from the centering processing circuit 34. That is, although the positional signal indicates "0", the vibration-component signal which is not equal to "0" is added, so that the servo circuit 44 generates a correction signal with which to move the lens 60.

The camera-shake correction employed in the present embodiment is not a so-called electronic camera-shake correction but an optical camera-shake correction such as a lens-shift method where the lens is shifted optically, as described above. Here, the so-called electronic camera-shake correction is a method where the image signal outputted from the image pickup devices is loaded once into memory, compared with the next image and therefore a camera-shake factor is removed.

Since the VCM 80a moves the lens 60 based on the correction signal outputted from the servo circuit 44, the image pickup devices 100 can acquire signals where the displacement of an object due to the camera shake is suppressed. Repeating such a control as this achieves the camera-shake correction control.

Figure 2:
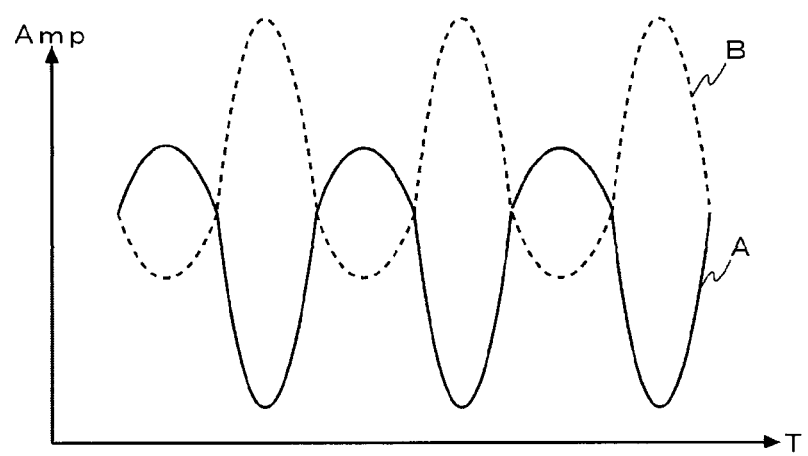
FIG. 2 shows a relationship between an output signal (waveform A) of a position detecting element and an output signal (waveform B) of a first equalizer according to a first embodiment of the present invention.

FIG. 2 shows a relationship between the output signal (waveform A) of the hall element 70a and the output signal (waveform B) of the first equalizer 24 according to the first embodiment. Though the analog signal is used in FIG. 2 for ease of explanation, the actual signal is digital signals.

As evident from FIG. 2, the state where there is no difference in phase between the output signal (waveform A) of the hall element 70*a* and the output signal (waveform B) of the first equalizer 24 and the amplitudes thereof are opposite in polarity and equal to each other represents the state where a camera-shake component is ideally corrected. This state shows that the VCM 80*a*, the hall element 70*a*, the gyro sensor 50*a* and the image stabilization control circuit 20 are operating normally.

By employing the first embodiment as described above, the verification of operation on the optical camera-shake correction can be realized by the use of a simple method. Also, the digital signal after analog-to-digital conversion is computed and compared by the control unit 90, so that simple and highly accurate verification can be realized. Also, when a CPU is mounted on the image stabilization control circuit, this CPU can be effectively utilized for the operational verification.

Figure 3:
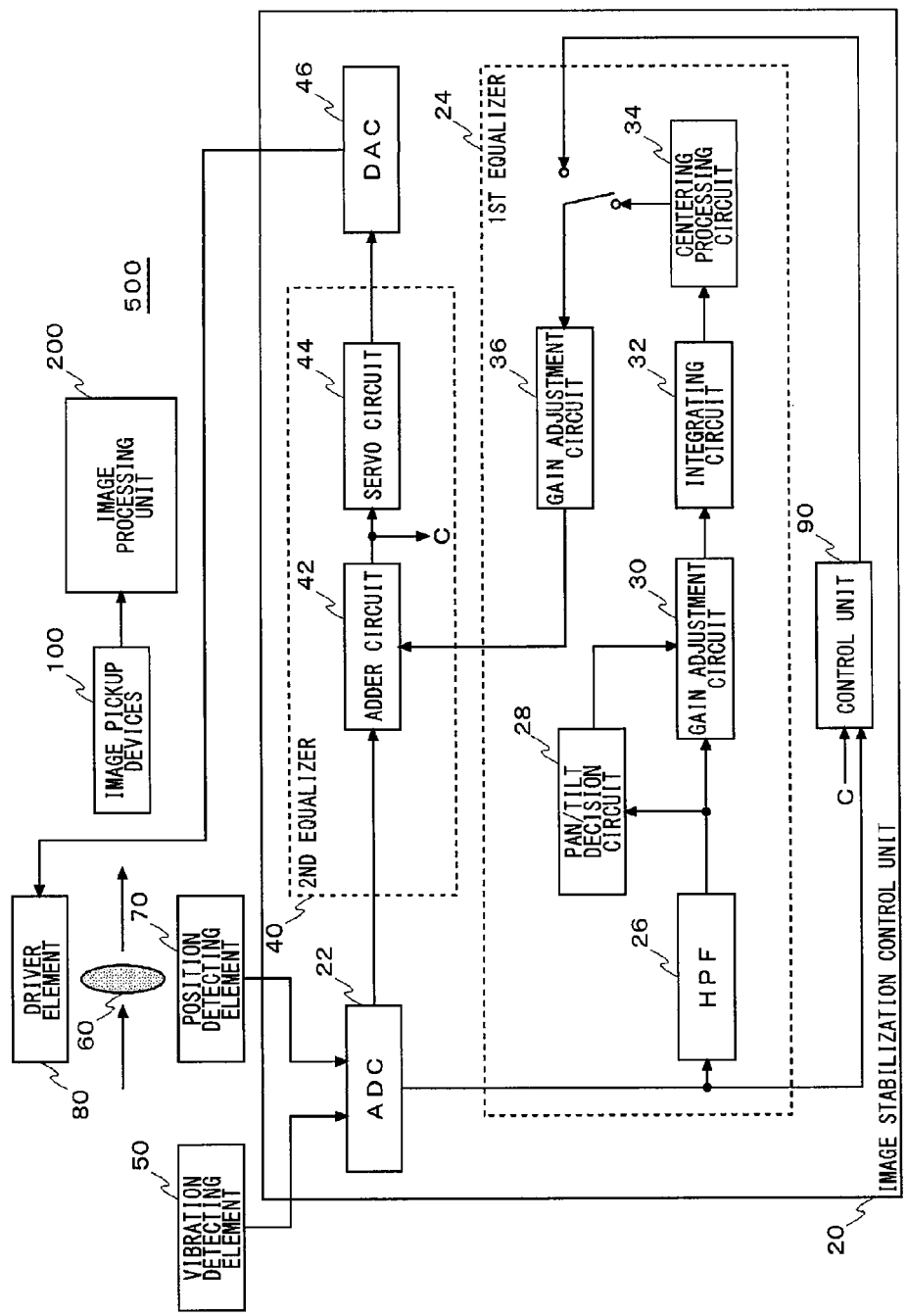
FIG. 3 is a block diagram showing a structure of an image pickup apparatus that includes an image stabilization control circuit according to a modification of the first embodiment.

FIG. 3 is a block diagram showing a structure of an image pickup apparatus 500 that includes an image stabilization control circuit 20 according to a modification of the first embodiment.

The structure and operation of the image pickup apparatus 500 according to the present modification are basically the same as those of first embodiment. The modification differs from the first embodiment in the position where the control unit 90 retrieves a signal to be verified.

In this modification, it is verified whether the phase difference in between the output signal of the hall element 70*a* and the output signal of the first equalizer 24 is zero or not. It is therefore verified that an output signal C of the adder circuit 42 is zero or not. That is, though in the above-described basic example the control unit 90 adds up the output signal (signal A of FIG. 1) of the hall element 70*a* and the output signal (signal B of FIG. 1) of the first equalizer 24, this addition processing is done by the adder circuit 42 in the modification. In the modification, the control unit 90 is used only for the purpose of verifying whether this addition result is zero or not. The other operations in the modification are similar to those of the basic example.

According to the above-described modification of the first embodiment of the present invention, the same advantageous effects as those of the first embodiment are achieved. As compared with the basic example, the present modification can simplify the processing of the control unit 90.

Figure 4:
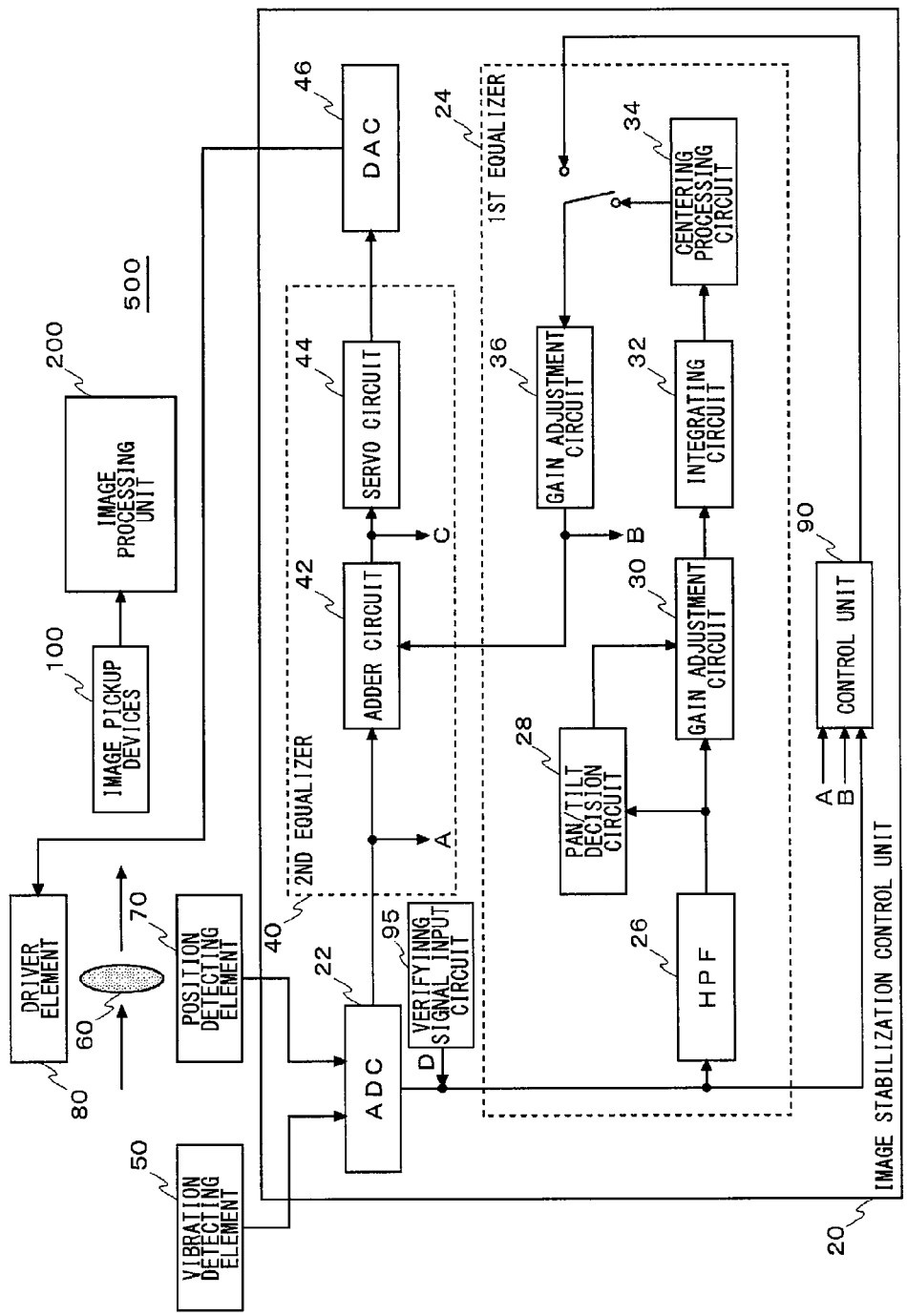
FIG. 4 is a block diagram showing a structure of an image pickup apparatus that includes an image stabilization control circuit according to a second embodiment of the present invention.

FIG. 4 is a block diagram showing a structure of an image pickup apparatus 500 that includes an image stabilization control circuit 20 according to a second embodiment of the present invention.

The structure and operation of the image pickup apparatus 500 according to the second embodiment are basically the same as those of first embodiment shown in FIG. 1. The second embodiment differs from the first embodiment in that the operation verification is executable without the use of the shaker and a verifying-signal input circuit 95 which inputs a signal used for verification to the first equalizer 24 is added. A detailed description of the second embodiment will now be given as follows.

The control unit 90 verifies the operations of the VCM 80*a*, the hall element 70*a* and the first equalizer 24, based on the output signal of the first equalizer 24 and the output signal of the hall element 70*a*, in a situation where a verifying signal D is inputted to the first equalizer 24 from the verifying-signal input circuit 95.

The signal D used for verification may be a sinusoidal signal. A signal generated by a sinusoidal oscillator provided outside or inside the image stabilization control circuit 20 can be used as the sinusoidal signal. In the latter case, there may be cases where the sinusoidal oscillator is provided within the second equalizer 40. The sinusoidal signal can also be used for the verification of the servo circuit 44.

In FIG. 4, a sinusoidal wave expressed in the form of a digital signal oscillated from the sinusoidal oscillator is supplied to an input terminal of the first equalizer 24 as a verifying signal D. An arrangement may be such that an analog-signal sinusoidal wave resulting from the digital-to-analog conversion of the digital-signal sinusoidal wave is supplied to a stage preceding the ADC 22. In this case, the digital-to-analog conversion can be carried out by the DAC 46 by employing time sharing processing.

Similar to the first embodiment, the control init 90 verifies whether the phase difference in between the output signal of the hall element 70*a* and the output signal of the first equalizer 24 is zero or not. More specifically, whether the amplitudes of the output signal of the hall element 70*a* and the output signal of the first equalizer 24 are opposite in polarity and equal to each other or not is verified.

The control unit 90 can verify the operation of the first equalizer 24, based on the output signal of the first equalizer 24, in a situation where the verifying signal D is inputted to the first equalizer 24. More specifically, whether the phase difference in between the verifying signal D and the output signal of the first equalizer 24 is 90 degrees or not is verified. Since the first equalizer 24 includes the integrating circuit 32, the phase of the output signal of the first equalizer 24 must lag that of the input signal thereof by 90 degrees if the first equalizer 24 is normal.

Figure 5:
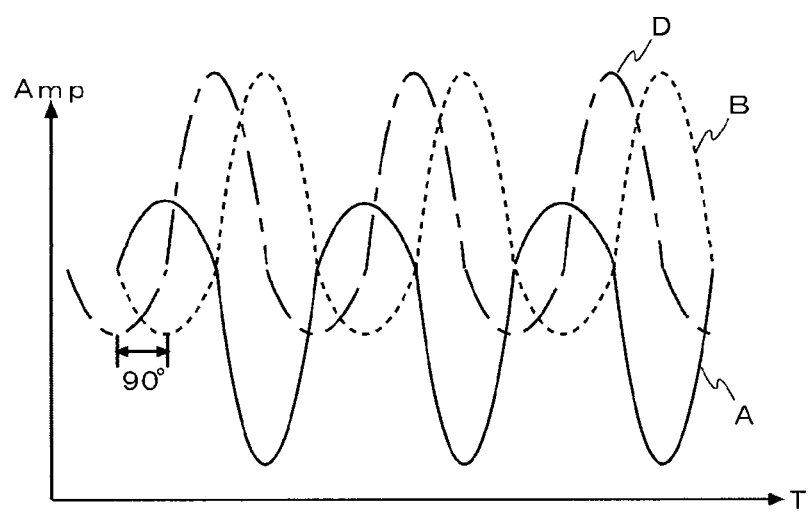
FIG. 5 shows a relationship among a verifying signal (waveform D), an output signal (waveform B) of a first equalizer and an output signal (waveform A) of a position detecting element according to a second embodiment of the present invention.

FIG. 5 shows a relationship among the verifying signal (waveform D), the output signal (waveform B) of the first equalizer 24 and the output signal (waveform A) of the hall element 70*a* according to the second embodiment of the present invention. As shown in FIG. 5, the amount of movement is detected in an ideal state where the phase difference in between the verifying signal (waveform D) and the output signal (waveform B) of the first equalizer 24 is 90 degrees. That is, the first equalizer 24 operates normally. The state where there is no phase difference in between the output signal (waveform A) of the hall element 70*a* and the output signal (waveform B) of the first equalizer 24 and the amplitudes thereof are opposite in polarity and equal to each other indicates the state where the vibration components are ideally corrected. This represents the state where the VCM 80*a*, the hall element 70*a*, the gyro sensor 50*a* and the image stabilization control circuit 20 operate normally. If the phase difference in between the verifying signal D and the output signal of the first equalizer 24 lies within a range of values, set by the designer, which can be regarded as 90 degrees, the control unit 90 will determine the phase difference to be 90 degrees.

By employing the second embodiment as described above, the verification of operation on the optical camera-shake correction can be realized by the use of a simple method. The vibrated state is artificially created by inputting the verifying signal, thereby eliminating the use of the shaker. Similarly to the first embodiment, the digital signal after analog-to-digital conversion is computed and compared by the control unit 90, so that simple and highly accurate verification can be realized. Also, when a CPU is mounted on the image stabilization control circuit, this CPU can be effectively utilized for the operational verification.

The present invention has been described based upon illustrative embodiments. These embodiments are intended to be illustrative only and it will be obvious to those skilled in the art that various modifications to constituting elements and processes could be developed and that such modifications are also within the scope of the present invention.

In the second embodiment, too, the operational verification can be done by supplying the output signal C of the adder circuit 42 to the control circuit 90.

If, as a result of operational verification, there is a difference in between the absolute value of amplitude of the output signal of the hall element 70a and that of the first equalizer 24, the correction can be made by amplifying at least one of the output signal of the gyro sensor 50a and the output signal of the hall element 70a in such a manner as to make the difference therebetween zero. It is only necessary to adjust the gain of a not-shown amplifier circuit provided subsequent to the gyro sensor 50a and the hall element 70a.

In the above-described embodiments, the gyro sensor, the hall element and the voice coil motor function as the vibration detecting element 50, the position detecting element 70 and the driver element 80, respectively, but these should not be considered as limiting. For example, a structure may be such that the vibration detecting element 50 detects the vibration of the image pickup apparatus 500, based on an acceleration signal, by the use of a sensor for detecting the acceleration in the rectilinear direction. A piezo element, a stepping motor or the like may be used for the driver element 80. An MR element, a photo screen diode or the like may be used for the position detecting element 70.

In the above-described embodiments, used is the lens-shift method for performing the camera-shake correction processing by driving the lens. However, embodiments of the present invention are not limited thereto. For example, the present embodiments are applicable to an image pickup element shift method where the image pickup devices 100 are shifted according to a displacement in the position of the image pickup apparatus 500 due to the camera shake or the like. In this case, the position detecting element 70 can detect the position of the image pickup devices 100, so that the driver element 80 can function as an element that drives the image pickup devices 100.

While the preferred embodiments of the present invention have been described using specific terms, such description is for illustrative purposes only, and it is to be understood that changes and variations may be further made without departing from the spirit or scope of the appended claims.

What is claimed is:

1. An image stabilization control circuit for correcting an optical axis of an image pickup apparatus in response to a vibration thereof, the circuit comprising:
   a first equalizer which generates a vibration-component signal indicating a amount of movement of the image pickup apparatus according to an output signal of a vibration detecting element for detecting the vibration of the image pickup apparatus;
   a second equalizer which generates a drive signal used to control a driver element to correct the position of a lens or image pickup devices, based on an output signal of a position detecting element for detecting the position of the lens to be driven or the image pickup devices to be driven and the vibration-component signal; and
   a control unit which verifies operations of the driver element, the position detecting element, the vibration detecting element and said first equalizer, based on the output signal of the position detecting element and the vibration-component signal,
   wherein said control unit verifies the operations thereof by verifying whether a phase difference in between the output signal of the position detecting element and the vibration-component signal is zero or not.

2. An image stabilization control circuit according to claim 1, wherein said control unit verifies the operations thereof by verifying whether the amplitudes of the output signal of the position detecting element and the vibration-component signal are opposite in polarity and equal to each other or not.

3. An image pickup apparatus, comprising:
   the lens;
   the image pickup devices;
   the driver element;
   the position detecting element;
   the vibration detecting element; and
   the image stabilization control circuit according to claim 1.

4. An image stabilization control circuit for correcting an optical axis of an image pickup apparatus in response to a vibration thereof, the circuit comprising:
   a first equalizer which generates a vibration-component signal indicating a amount of movement of the image pickup apparatus according to an output signal of a vibration detecting element for detecting the vibration of the image pickup apparatus;
   a second equalizer which generates a drive signal used to control a driver element to correct the position of a lens or image pickup devices, based on an output signal of a position detecting element for detecting the position of the lens to be driven or the image pickup devices to be driven and the vibration-component signal; and
   a control unit which verifies operations of the driver element, the position detecting element, the vibration detecting element and said first equalizer, based on the output signal of the position detecting element and the vibration-component signal,
   wherein said control unit verifies the operations thereof by verifying whether the amplitudes of the output signal of the position detecting element and the vibration-component signal are opposite in polarity and equal to each other or not.

* * * * *